(12) United States Patent
Zhao

(10) Patent No.: US 12,045,289 B2
(45) Date of Patent: Jul. 23, 2024

(54) SECURE HIERARCHICAL PROCESSING USING A SECURE LEDGER

(71) Applicant: Cleveland State University, Cleveland, OH (US)

(72) Inventor: Wenbing Zhao, Cleveland, OH (US)

(73) Assignee: Cleveland State University, Cleveland, OH (US)

( * ) Notice: Subject to any disclaimer, the term of this patent is extended or adjusted under 35 U.S.C. 154(b) by 527 days.

(21) Appl. No.: 17/199,345

(22) Filed: Mar. 11, 2021

(65) Prior Publication Data

US 2021/0397655 A1    Dec. 23, 2021

Related U.S. Application Data

(60) Provisional application No. 62/988,151, filed on Mar. 11, 2020.

(51) Int. Cl.
  *G06F 16/903* (2019.01)
  *G06F 16/18* (2019.01)
  *G06F 21/44* (2013.01)

(52) U.S. Cl.
  CPC .... *G06F 16/90335* (2019.01); *G06F 16/1805* (2019.01); *G06F 21/44* (2013.01)

(58) Field of Classification Search
  CPC . G06F 16/90335; G06F 16/1805; G06F 21/44
  See application file for complete search history.

(56) References Cited

U.S. PATENT DOCUMENTS

| | | | | |
|---|---|---|---|---|
| 9,465,891 | B1* | 10/2016 | Kagan | G06T 17/30 |
| 10,491,608 | B1* | 11/2019 | Tatge | H04L 63/0492 |
| 11,062,042 | B1* | 7/2021 | McKervey | H04L 63/123 |
| 11,860,858 | B1* | 1/2024 | McKervey | H04L 9/0643 |
| 2018/0285996 | A1* | 10/2018 | Ma | H04L 9/3297 |
| 2019/0129829 | A1* | 5/2019 | Chen | G06N 7/01 |
| 2019/0319808 | A1* | 10/2019 | Fallah | H04L 9/3239 |
| 2020/0162239 | A1* | 5/2020 | Carver | H04L 63/123 |
| 2020/0167341 | A1* | 5/2020 | Carver | H04L 63/062 |
| 2020/0186568 | A1* | 6/2020 | Erb | H04L 9/0841 |
| 2020/0226113 | A1* | 7/2020 | Cuellar | H04L 9/0643 |
| 2020/0327100 | A1* | 10/2020 | Androulaki | G06Q 20/223 |
| 2021/0243009 | A1* | 8/2021 | Kawahara | H04L 9/3239 |

* cited by examiner

*Primary Examiner* — J. Brant Murphy
(74) *Attorney, Agent, or Firm* — Calfee, Halter & Griswold LLP

(57) ABSTRACT

Disclosed is a system and method for processing data using blockchain technology. The system includes a memory having programmable instructions stored thereon that, when executed by a processor, cause the system to: authenticate one or more sensors in anticipation of receiving component data; receive component data, upon successful authentication; store the component data locally or to a cloud-based server and/or calculate a root value for the component data; store or embed the root value with the stored component data; condense the component data and link the condensed component data to the stored component data via the root value. The system further includes instructions to log the condensed data, including the root value, to a ledger, and to identify a tag or transaction id corresponding to the logging event for subsequent retrieval of the condensed data using the tag or transaction id.

19 Claims, 10 Drawing Sheets

SECURE HIERARCHICAL PROCESSING USING A SECURE LEDGER

CROSS-REFERENCE TO RELATED APPLICATION

This application claims priority to and all benefit of U.S. Provisional Patent Application Ser. No. 62/988,151, filed on Mar. 11, 2020, the entire disclosure of which is incorporated herein by reference.

GOVERNMENT FUNDING

This invention was made with government support under DE-FE0031745 awarded by The U.S. department of Energy. The government has certain rights in the invention.

TECHNICAL FIELD

The general inventive concepts relate generally to computer systems, and more particularly to a system and method for securely processing and logging data with blockchain technology.

BACKGROUND

Conventional data security and backup mechanisms have a variety of drawbacks and can be compromised and/or manipulated by a number of factors.

Therefore, a need exists for systems and methods of securely obtaining, logging, storing, and retrieving data.

SUMMARY

In an exemplary embodiment, a system for logging data is provided. The system includes a memory with programmable instructions for logging data to a ledger stored thereon. The system also includes a processor in communication with the memory and configured to execute the programmable instructions to perform one or more operations. The operations may include receiving component data from one or more sensors. Additionally, the operations may include calculating a root value based in part on the component data. The operations may further include aggregating the component data. In some embodiments, the component data may be stored to a local or remote server (e.g., a cloud-based server) prior to being aggregated (e.g., upon receipt of the component data from the one or more sensors). The operations may also include linking the aggregated data to the component data (e.g., the stored component data) using the root value, and logging the aggregated data to the ledger. Additionally, the operations may include identifying a transaction ID corresponding to the logging of the aggregated data or root value to the ledger. The ledge may be a secure distributed ledger (e.g., a blockchain). The operations may also include authenticating the one or more sensors prior to receiving the component data. The component data may include a condition of one or more components or operation data of one or more components that are monitored by the one or more sensors.

In yet a further exemplary embodiment, a system for retrieving data from a ledger (e.g., a blockchain) is provided. The system includes a memory with programmable instructions for retrieving data from a ledger stored thereon. The system also includes a processor in communication with the memory and configured to execute the programmable instructions to perform one or more operations. The operations may include identifying a search command and user search query. The search command and/or user search query may be identified or otherwise received via a user interfaced. The search query may include transaction information corresponding to a logging of the condensed data and/or root data to the ledger. Additionally, the operations may include searching the ledger based on a user search query and identifying condensed data, including root data, in the ledger based on the user search query. The operations may further include searching a storage device (e.g., a local storage device and/or cloud-based storage device) for raw data based on the root data, and identifying the raw data corresponding to the condensed data. Additionally, the operations may include presenting one or more of the raw data, information corresponding to the raw data or the raw data search, to the user (e.g., via the user interface).

In another exemplary embodiment, a non-transitory computer-readable medium including programmable logic for retrieving condensed data from a ledger is provided. The programmable logic, when executed by a processor, performs operations to: search a ledger based on a user search query; identify condensed data, including a root value, in the ledger based on the user search query; search a storage device for raw data corresponding to the condensed data based on the root value; identify the raw data; and present one or more of the raw data, information corresponding to the raw data, or information corresponding to the search for the raw data to the user.

These and other objects, features and advantages of the present disclosure will become more readily apparent from the following detailed description of illustrative embodiments thereof, which is to be read in connection with the accompanying drawings.

BRIEF DESCRIPTION OF THE DRAWINGS

These and other features of the general inventive concept will become better understood by means of the following description and accompanying drawings in which.

DETAILED DESCRIPTION

The general inventive concepts will be understood more fully from the detailed description given below and from the accompanying drawings of the various aspects and implementations of the disclosure. This should not be taken to limit the general inventive concepts to the specific aspects or implementations, which are being provided for explanation and understanding only.

Figure 1:
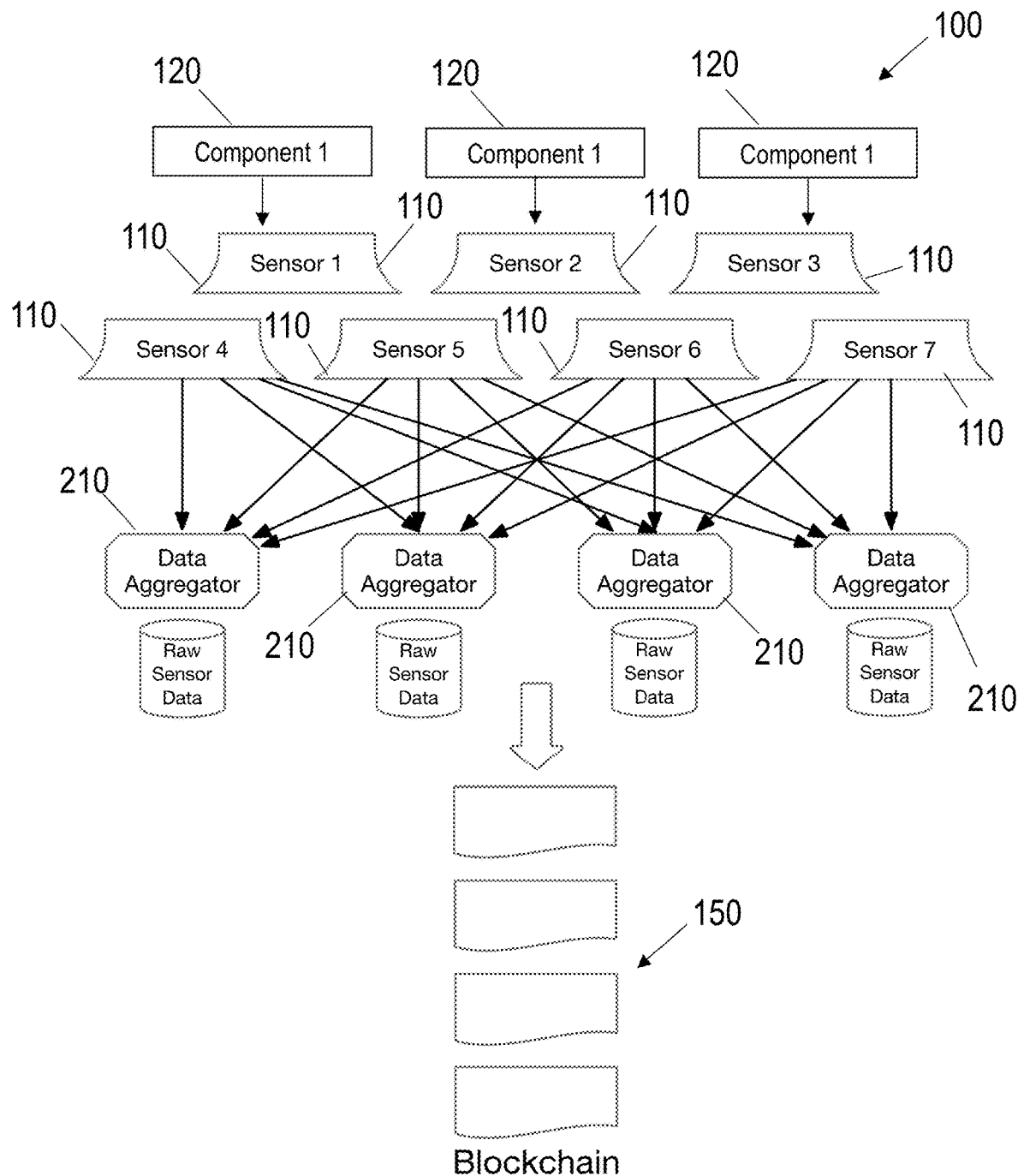
FIG. 1 illustrates a block diagram of an exemplary system for processing and logging data to a secure ledger, in accordance with the general inventive concepts.

With reference to FIG. 1, an exemplary embodiment of a system 100 for securely processing and logging data with blockchain technology is illustrated.

The system 100 may include one or more sensors 110, or a similar monitoring device, operably configured to monitor one or more components 120. The system may also include a memory 130 and a processing circuit (also referred to as a processor) 140. The processor 140 may be in signal communication with the memory 130 to execute programmable logic (e.g., a data processing logic (DPL) 200 stored on the memory 130.

In some embodiments, the DPL 200 may include instructions for processing component data and storing the processed component data to a ledger 150 (e.g., a secure distributed ledger (e.g., blockchain)).

Additionally, or alternatively, the DPL 200 may include instructions for retrieving processed data from the ledger 150.

The sensor 110 may be configured to identify or otherwise collect component data, which may include a state or condition of the monitored component. In some embodiments, the component data may include operational data corresponding to the component and/or a collection of components.

The component conditions may correspond to a state of any hardware and/or software component, or in some embodiments, a group of components. Examples of component conditions may include temperature, vibration, pressure, electrical, contact, etc.

In some embodiments, the sensor 110 may be a node (e.g., a sensing node). Additionally, or alternatively, the sensor 110 may be software (e.g., programmable logic), or a combination of hardware and software, operationally configured to sense condition of a component 120 and/or to collect operational data corresponding to the component 120. It should be appreciated that the type of sensor 110 used by the system 100 may be determined by type of condition(s). For example, a vibration sensor 110 may be used for identifying vibrations, a pressure sensor 110 may be used for identifying changes in pressure. Additionally, or alternatively, one or more detectors and/or transducers may be provided, for example, to identify component conditions that each and/or transducer and/or detector maybe be specifically configured to detect.

The components 120 monitored by the sensor 110 may be hardware components, software (e.g., software modules), or in some embodiments, a combination of both hardware and software. For example, in a fossil fuel power plant environment, the component may be a boiler, generator, a controller, and/or a control system.

Figure 2:
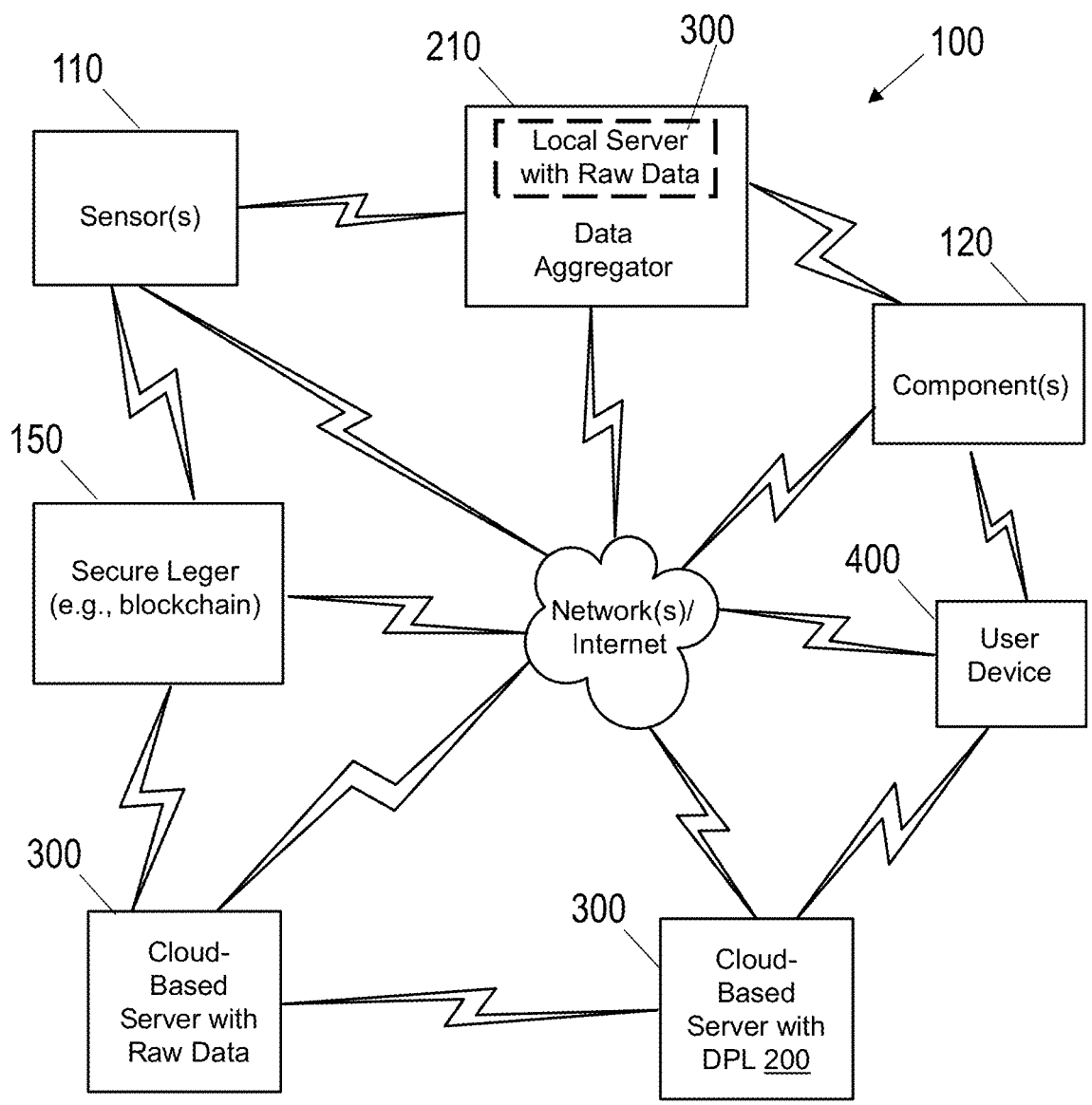
FIG. 2 illustrates an exemplary system for processing, logging, and receiving data via a secure ledger, in accordance with the general inventive concepts.
Figure 3:
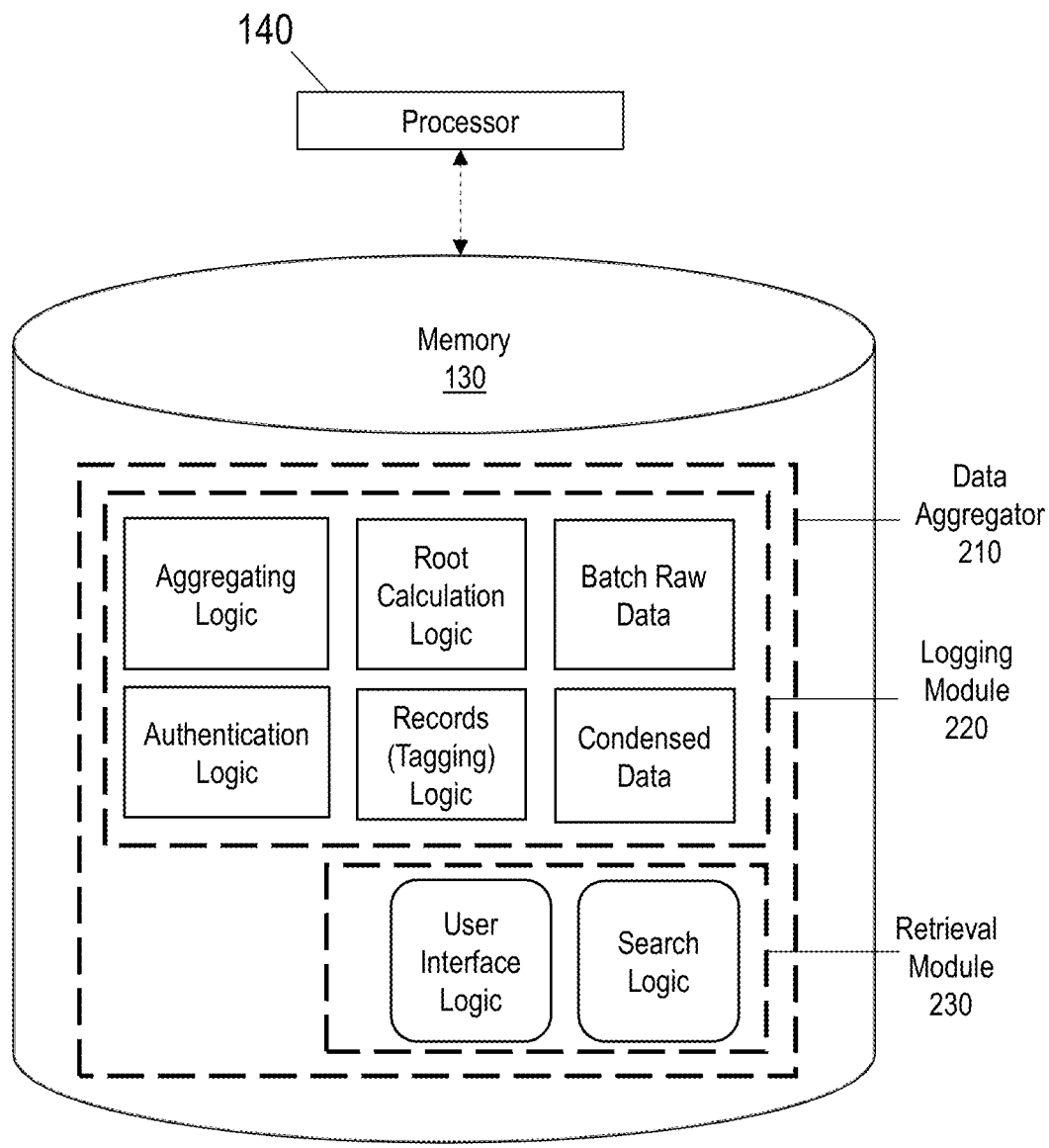
FIG. 3 illustrates an exemplary embodiment of a data aggregator for processing, logging, and receiving data via a secure ledger, in accordance with the general inventive concepts.

With continued reference to the figures, and now with reference to FIG. 2 and FIG. 3, the system 100 may include one or more data aggregators 210 operationally configured to process component data collected by the sensor 110.

In some embodiments, the data aggregator 210 may be a node (e.g., as shown in FIG. 2) in operable communication with one or more of the subsystems in the system 100 (e.g., the sensor 110, the ledger 150, a local and/or cloud-based storage 300, a user device 400, etc.).

Additionally, or alternatively, for example, as shown in FIG. 3, the data aggregator 210 may be programmable logic of the DPL 200. In some embodiments, the data aggregator 210 may include instructions that, when executed by the processor 140, cause the system 100 to perform one or more operation to aggregate (i.e., condense) raw component data and to log the condensed data to a ledger 150 (e.g., via a logging module 220 (FIG. 3)).

Additionally, or alternatively, the data aggregator 210 may include instructions that, when executed, cause the system 100 to perform one or more operations to retrieve data (e.g., the condensed data) from the ledger 150 (e.g., via a retrieval module 230 (FIG. 3)).

In some embodiments, prior to accessing or otherwise receiving the component data from the sensor 110, the data aggregator 210 may authenticate the sensor 110 (e.g., via authentication logic (FIG. 3)).

Authenticating the sensor 110 confirms to the data aggregator 210 that the sensor 110 is legitimate, not compromised, and authorized to provide or otherwise transmit component data to the data aggregator 210.

Additionally, or alternatively, the data aggregator 210 may include instructions to confirm that the sensed data and/or the collected component data is not comprised (e.g., is not corrupted and/or does not include malicious code prior to receiving the component data.

With continued reference to the figures, and if applicable, upon authenticating the sensor 110, the data aggregator 210 may begin accessing or otherwise receiving the component data from the sensor 110.

With continued reference to the figures, and with reference now to FIG. 4, FIG. 5, FIG. 6, FIG. 7, and FIG. 8, in some embodiments, for every batch of component data collected by the sensor 110, and received by the data aggregator 210, this raw component data may be condensed (e.g., via aggregating logic (FIG. 3)).

Additionally, or alternatively, this raw component data may be used for computing (i.e., calculating) a root (also referred to as a root value) 240 (FIG. 8)) of a Merkle Tree for the raw component data.

Figure 4:
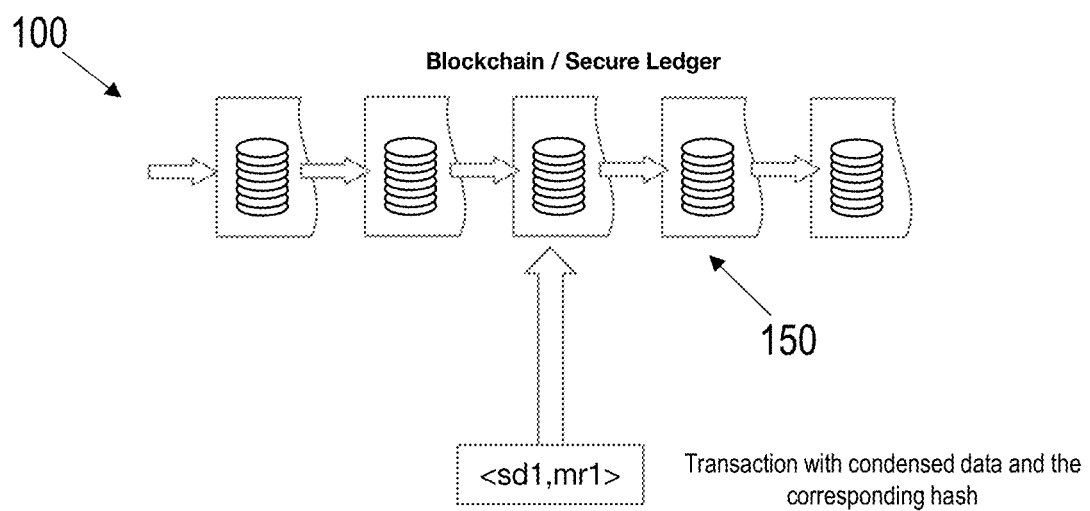
FIG. 4 is a second block diagram of an exemplary system for processing and logging data to a secure ledger, in accordance with the general inventive concepts.
Figure 4:
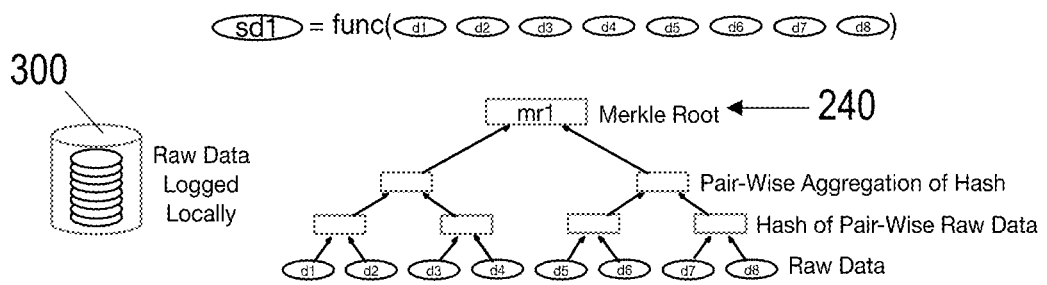
Figure 5:
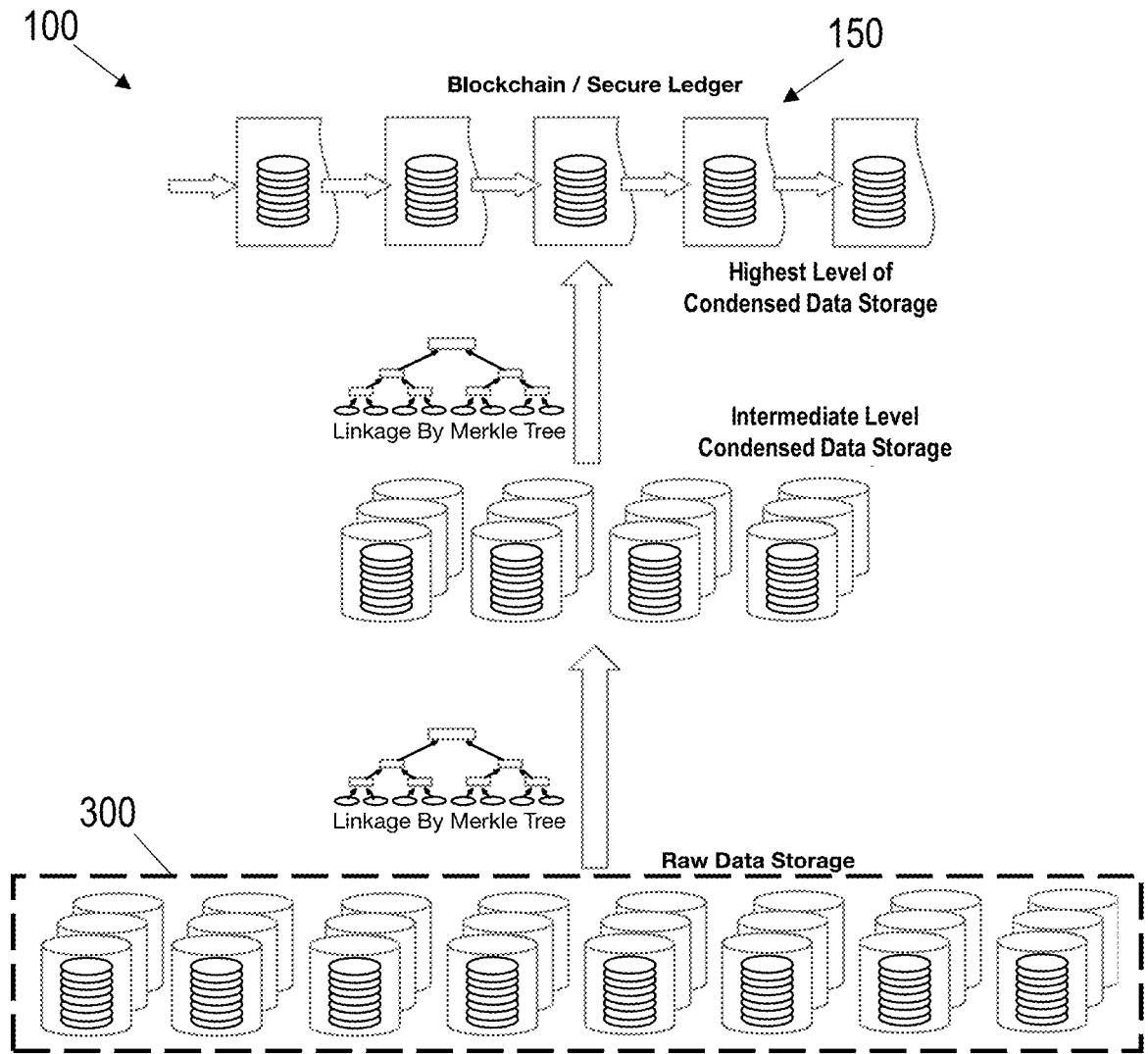
FIG. 5 is a third block diagram of an exemplary system for processing and logging data to a secure ledger, in accordance with the general inventive concepts.
Figure 6:
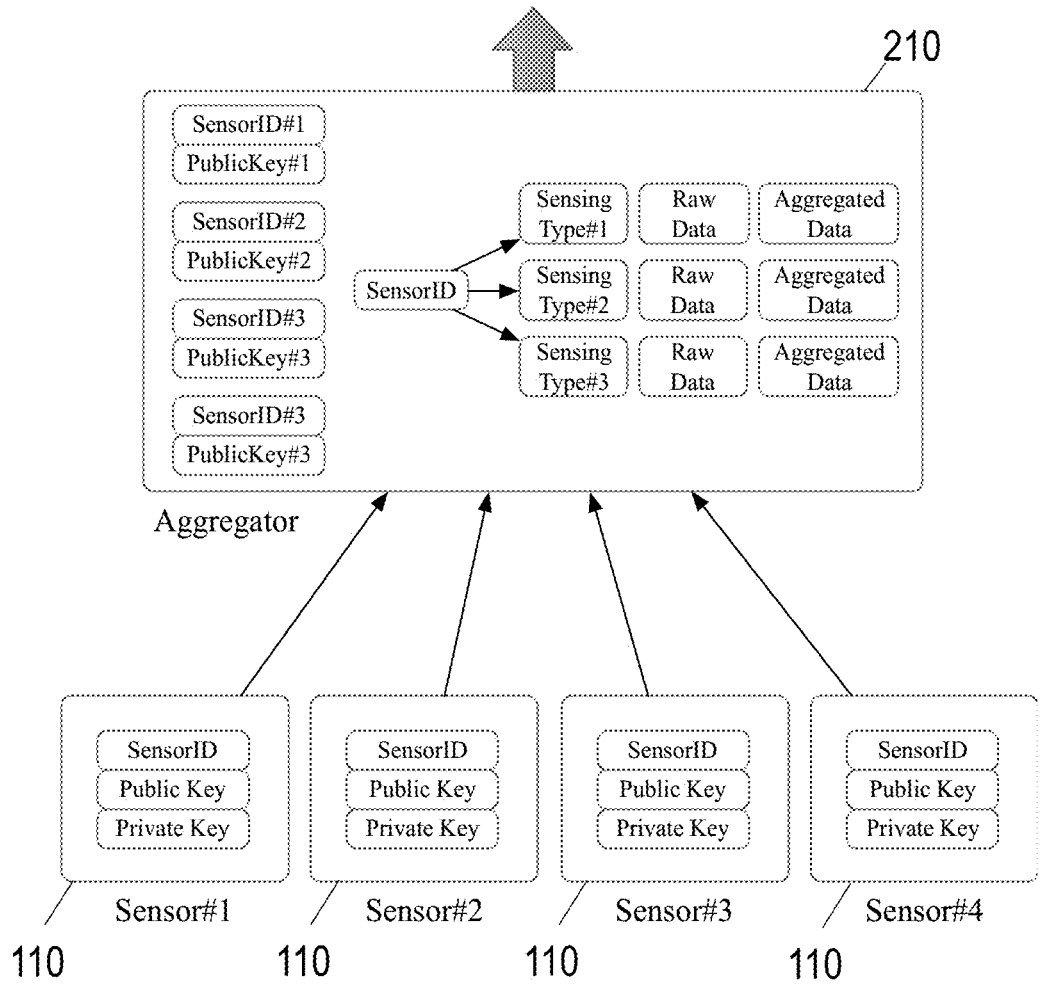
FIG. 6 illustrates a second exemplary embodiment of a data aggregator, in accordance with the general inventive concepts.

In some embodiments, to condense the component data, the data aggregator 210 may include instructions (e.g., root calculation instructions (FIG. 3)) to build a Merkle tree (e.g., as shown in FIG. 4) of the raw component data, or in some embodiments, the batches of raw component data.

For illustration purpose, we assume that the batch size is 8 and the raw data items are labeled as d1, d2, . . . d8. If the summary requires an odd number of raw data items, then the last item is repeated to make it possible to build the Merkle tree. The Merkle tree is constructed as shown in FIG. 4. Therefore, the Merkle root contains hashes of all the data items in the batch. The root 240 of this Merkle tree (e.g., as shown in FIG. 4) is the hash computed based on the batch of raw component data. In some embodiments, the root 240 may be used for identifying and/or retrieving the raw component data.

In some embodiments, the data aggregator 210 may include instructions to store the raw data for subsequent retrieval. The raw data may be stored at a local storage drive (or server) of one or more subsystems of the system 100, or in some embodiments, at a remote data storage (e.g., a cloud-based server 300), which may be in communication with the system 100 and/or one or more of its subsystems over the internet.

In some embodiments, the stored raw data may be replicated for redundancy (e.g., using RAID 1, RAID 2, etc.), and the replication may be achieved at the local server and/or the cloud-based server using a redundant array of independent disks.

It should be appreciated that some embodiments of the SPL 200 may be executed by or from a cloud-based server 300 or similar remote device known to persons of ordinary skill in the art.

In some embodiments, the raw data may be stored or otherwise saved prior to calculating the root 240 and/or aggregating the raw data (e.g., upon receiving the raw data from the sensor 110).

Additionally, or alternatively, the raw data may be stored after calculating the root 240 or simultaneously with another system 100 operations (e.g., when logging the aggregated data to the ledger 150).

In some embodiments, the root 240 may be included (stored) with the stored raw data for use when searching for the raw data and/or for information corresponding to the raw data. In some embodiments, the root 240 may be embedded with the stored raw data. Additionally, or alternatively, the root 240 may be stored before or after the raw data is stored.

It should be appreciated that the root 240 included with the stored raw data should be searchable, e.g., via a linear query (and/or other query type) to allow for retrieval of the raw component data based on the root 240.

In some embodiments, the data aggregator 210 may include instructions to link the stored raw data to the aggregated data using the root 240. For example, the root 240 may be associated or otherwise stored with both the stored raw data and the aggregate data in the ledger 150. Because the stored raw data root 240 would be identical to the root 240 included with the aggregated data based on the stored raw data, a subsequent search for stored raw data based on a root 240 from the aggregated data from the ledger 150 would identify the raw data that was aggregated to said aggregated data.

In some embodiments, for example, linking the raw data to the aggregated data may be achieved using the Merkle Tree. However, it should be appreciated that other means known in the art for hashing data may be used for establishing a linkage between stored raw data and its aggregated version logged to a ledger 150.

With continued reference to the figures, the data aggregator 210 may include instructions that, when executed, cause the system 100 to log the aggregated data, including the root 240, to the ledger 150.

With continued reference to the figures, and upon logging the aggregated data and/or the root 240 to the ledger 150, transaction information associated with the logging event may be identified.

In some embodiments, for example, the transaction information may be generated and/or provided by the ledger 150.

Additionally, or alternatively, the transaction information may be generated via the DPL 200 (e.g., via records logic) or one or more of the system 100 subsystems. It should be appreciated that the transaction information may be used by a user to search the ledger 150 for the aggregated data and/or the root 240 to identify the raw data or information corresponding to the raw data.

With continued reference to the figures, the system 100 (or in some embodiments, the retrieval module 230) may include instructions that, when executed, cause the system 100 to perform one or more operations to retrieve data (e.g., the aggregated data and/or root 240) from the ledger 150.

In some embodiments, a search command may be received from a user to search the ledger 150 for aggregated data. The user may initiate the search from a user device 400 using a user interface, which may be generated or provided by retrieval user interface logic (FIG. 3).

The search command may include a user search query. In some embodiments, the search query may include the transaction information generated by or otherwise associated with the ledger 15 and/or the logging event that occurred when the aggregated data and/or root 240 were logged to the ledger 150.

Additionally, or alternatively, the search query may include additional criteria. In some embodiments, the additional criteria may correspond to at least one or more of the raw data, the aggregated data, or the transaction information associated with the aggregated data and/or root 240 being logged to the ledger 150.

With continued reference to the figures, the data aggregator 210 may include instructions to search the ledger 150 based on the search query (including any additional criteria, as applicable) in response to the search command.

Upon identifying the aggregated data and/or the root 240 based on the search query, the aggregated data and/or root 240 may be provided to the user, for example, via the user interface and/or the user device 400.

In some embodiments, the user may wish to identify the raw data corresponding to the aggregated data. In this case, the user may initiate a second search based on the root 240.

Additionally, or alternatively, the data aggregator 210 may include instructions to search the storage devices for the raw data corresponding to the aggregated data in real time (or near real-time) upon identifying the root 240.

Once the raw data has been identified, the DPL 200 may include instructions for displaying or otherwise presenting the raw data, information corresponding to the raw data or the raw data search to the user (e.g., via the user interface and/or user device 400).

Figure 9:
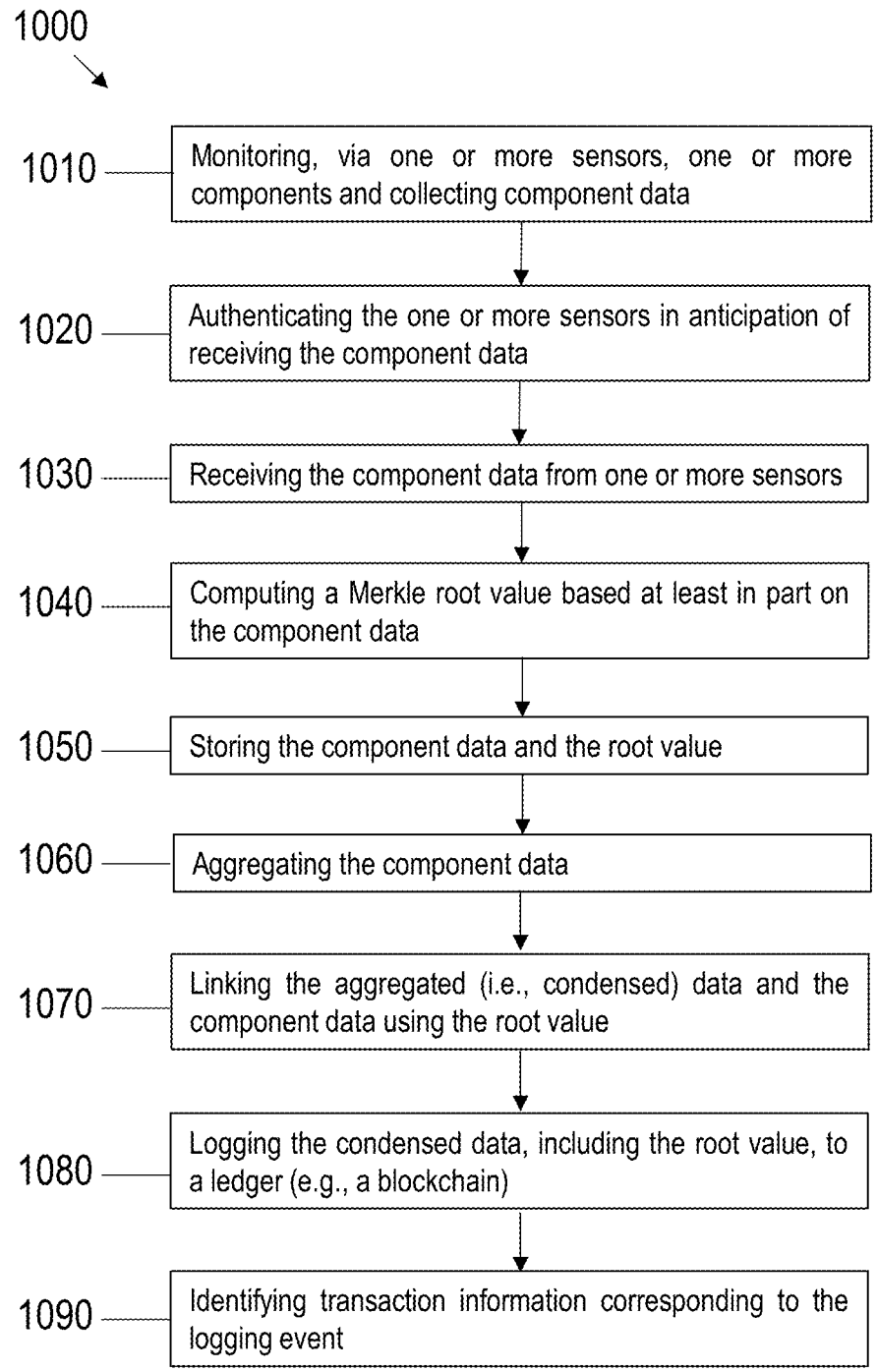
FIG. 9 is a flowchart of an exemplary embodiment of a method of processing and logging data to a secure ledger, in accordance with the general inventive concepts.

With continued reference to the figures, and with reference now to FIG. 9, a method 1000 for processing raw data and logging an aggregated version of the raw data to a ledger 150 (e.g., a public blockchain) is provided. It should be appreciated that the exemplary embodiments of a method described herein may be performed in a different order, with illustrated steps omitted, with additional steps added, or with a combination of reordered, combined, omitted, or additional steps.

In step 1010, the method includes monitoring, via one or more sensors 110, one or more components 120 and collecting component data. The sensors 110 monitor one or more of the components 120 to identify any component errors, and in some embodiments, to collect operation data for the monitored (or sensed) component 120.

In step 1020, the method includes authenticating one or more of the sensors 110 in anticipation of receiving the component data. In step 1030, the method includes receiving the component data from one or more sensors 110. In step 1040, the method includes computing a Merkle root 240 based at least in part on the component data. In step 1050, the method includes storing the component data and/or the root 240 calculated via the Merkle tree. It should be appreciated that the storing event may occur at any point before the logging event occurs. Additionally, or alternatively, the root 240 may be stored when storing the component data or any time before or after the component data has been stored.

In some embodiments, for authenticating a sensor, the system 100 may include a sensor identity management system (not shown). Sensor identity management is essential in mitigating the spoofing attacks, Sybil attacks, and injecting attacks because all these attacks exploit weakness in sensor authentication.

Additionally, or alternatively, a second embodiment of the sensor identity management system may be provided. The second embodiment may include sensor authentication based public-key cryptography, and rely on the immutability offered by blockchain to store the enrollment information. Perhaps the biggest difference between this embodiment and the PUF-based approach is that the sensor never shares its private information to the authenticator and the blockchain. Indeed, the public blockchain operates exactly like this and only the private key is held only by the user. The authentication of the user in blockchain is done completely by verifying the digital signature. Essentially, the digital signature is the zero-knowledge proof of the possession of the private key.

Figure 7:
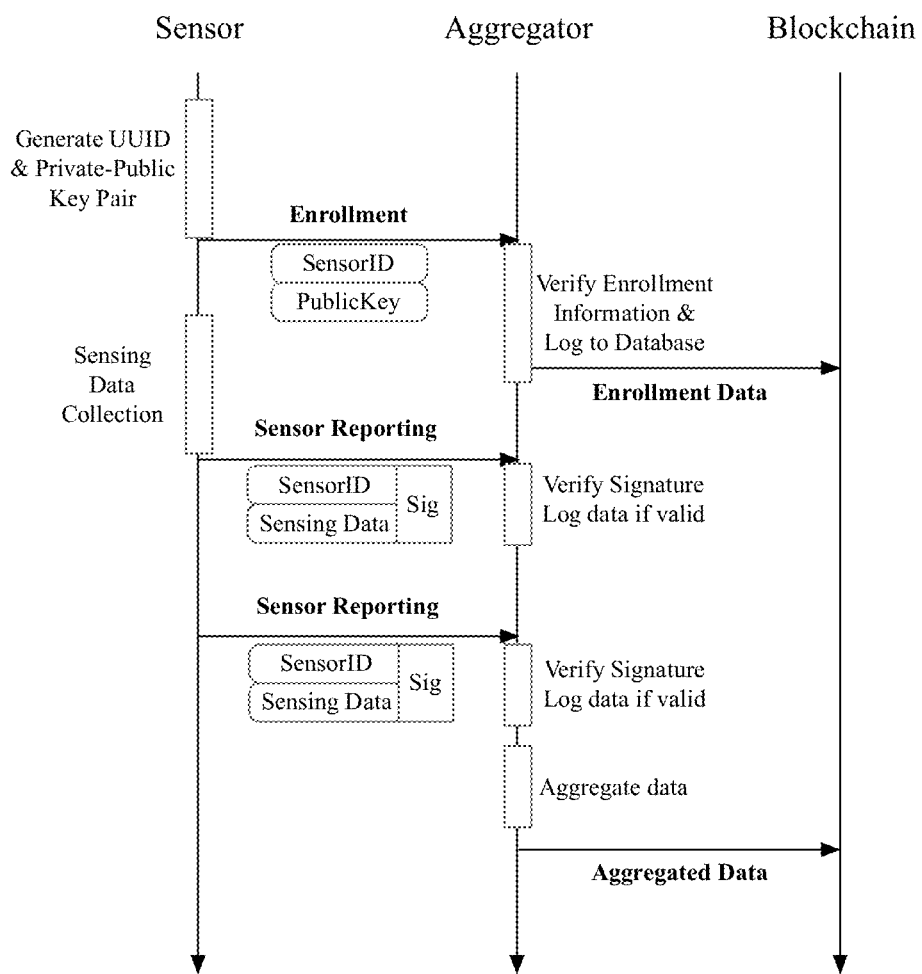
FIG. 7 illustrate a process flowchart of an exemplary embodiment of a system for processing and logging data to a ledger, in accordance with the general inventive concepts.
Figure 8:
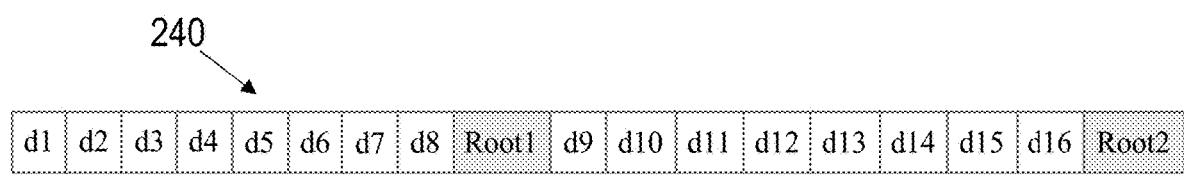
FIG. 8 illustrates an exemplary embodiment of a root value calculated in accordance with the general inventive concepts.

Additionally, or alternatively, as illustrate in FIG. 7, in adopting a blockchain approach for sensor authentication, we must ensure that each sensor has one and only one identity. We accomplish by the following two mechanisms: (i) when configuring a sensor, a unique identifier and one pair of private-public keys are created. The unique identifier may be used as the sensor ID. The sensor ID and the public key may be included in all messages sent to the authenticator that aggregates the messages. Furthermore, all messages will be digitally signed using the private key; and (ii) before the sensor can report a sensing reading to the data aggregator, the sensor must first enroll with the data aggregator. The enrollment message contains the sensor ID and the public key. The aggregator will store the sensor ID and the corresponding public key locally as well as uploading to the blockchain for safe keeping.

In some embodiments, the aggregator may be the entity that is responsible to authenticate the sensors. It uses a local database to store the sensor enrollment information as well as the sensor data, for example, in at least two separate tables. In some embodiments, a MongoDB may be used, which is a document-based database that does not require a schema. A JSON document may also be inserted into a MongoDB collection (which is similar to a table in traditional SQL database). In the enrollment table, each entry contains a tuple of sensor ID and the sensor's public key. In the sensor data table, a more sophisticated data structure is used. Because a sensor device might be equipped with several sensors, each entry starts with a sensor ID, and it is followed by the sensor type, the array of raw samples reported by the sensor, and finally the aggregated data. The raw samples are stored in memory until the aggregated data are computed. If the aggregation duration is long and the raw samples must be protected by faults such as power outages, a third table could be used to store the raw samples each time a sample is received.

Sensor authentication also requires the recording of the keys on the sensor devices. In this exemplary embodiment, soon as a sensor device is turned on and configured with the unique sensor ID and a pair of public-private keys, it attempts to enroll itself with the aggregator. The sensor ID and the private key are written in stable storage at the sensor device so that if the sensor device is rebooted the same sensor and the private key will be used. The device would perform enrollment only the first time it is configured. Like many public blockchains, the general inventive concepts use the Elliptic Curve Cryptography (ECC). In ECC, the private key is generated using a passphrase as the seed. The public key is derived from the private key. ECC public key and the signature are both much shorter than those produced by RSA.

Because the enrollment phase is the most vulnerable step in the system, it must be done in a controlled environment. For example, the sensor device should be placed physically together with the aggregator machine in close vicinity in the same room. Allowing any device to enroll without physical security will be detrimental to the security of the authentication scheme used here.

The aggregator will accept an enrollment request if it is for a new device. It will add an entry for the device in its enrollment table. The entry consists of a sensor ID and the corresponding public key. The aggregator can optionally create a transaction and store the enrollment entry immediately to the blockchain, or it may choose to aggregate a set of enrollment entries and then record them on the blockchain.

When a device reports a sample, the message must be digitally signed and it must include a sensor ID. The aggregator would first retrieve the sensor ID from the message, then it will perform a lookup in its enrollment table. If an entry is found, the corresponding public key is retrieved. The public key is used to verify the digital signature. The message will be discarded if the signature validation fails. To detect replay attacks, the aggregator would further check the timestamp included in the message. If the timestamp is the same or older than the last seen timestamp from the sensor, the message is also discarded. The message is accepted only when it has passed all these validations.

In step 1060, the method includes aggregating the component data. The component data may be aggregated, for example, using the Merkle tree hashing function. In step 1070, the method includes linking the aggregated data (i.e., the aggregated component data) and the stored component data using the root 240. It should be appreciated that the roots 240 included with both the stored component data and its aggregated data are identical to facilitate, via a search query using the root 240, a retrieval of the stored component data corresponding to the aggregated data from its storage device (e.g., the cloud-based server 300).

The detailed operation of the linkage establishment is shown in FIG. 4. For illustration purpose, we assume that the condensed data item sd1 is computed based on 8 raw data items labeled as d1, d2, . . . d8. If the summary requires an odd number of raw data items, then the last item is repeated to make it possible to build the Merkle tree. To establish a strong link between the condensed data item and the corresponding raw data items, we compute a Merkle tree using the set of raw data items. The root of this Merkle tree, mr1, would contain the hash of all these raw data items, and it is included together with the condensed data item in the transaction submitted to the blockchain. More precisely, each transaction contains a <sd, mr> tuple where sd is the condensed data for a particular sensor for the current period of consideration, and mr is the corresponding Merkel root hash of the set of raw data items used to compute the condensed data. We note that a transaction may include more than one such tuple depending on the number of sensors used and the frequency needed to compute the condensed data. In general, if n sensors are used, and they have the same summary frequency, then a transaction would contain n<sd,mr> tuple, one per sensor. The condensed data would be a temporal summary of the sensor data during this period.

If sensors are densely deployed with high redundancy, a further summary could be done spatially, i.e., across these redundant sensors.

This linkage would protect the raw data with the same security strength as the data on the blockchain. The blockchain technology ensures that once a record is placed on the blockchain, it cannot be altered or removed, and furthermore, no one could insert a non-existent record to the blockchain without being detected. This same guarantee applies to the raw data items. This is further illustrated in FIG. 5. For example, if a raw data item d # is altered or inserted into the raw data store, anyone can verify the record by recomputing the Merkle tree for the corresponding condensed data item. Because the root of the Merkle tree mr is included in the condensed data tuple as part of a transaction on the blockchain, we could then identify the corresponding tuple <sd, mr> in the transaction, and compare with the computed root with mr on the blockchain. If the two are not identical, then this raw data item is either altered or inserted into the raw data store.

Additionally, or alternatively, if a raw data item is removed from the raw data store, then the items would be shifted, and this can be detected again by recomputing the Merkle tree for the corresponding condensed data item and compare the tree root mr with the one included in the tuple on the blockchain.

It should be appreciated that the roots 240 included with both the stored component data and its aggregated data must be identical to facilitate, via a search query using the root 240, a retrieval of the stored component data corresponding to the aggregated data from its storage device (e.g., the cloud-based server 300).

In step 1080, the method includes logging the component data, including the root 240, to a ledger 150 (e.g., a blockchain).

In step 1090, the method includes identifying transaction information corresponding to the logging event. It should be appreciated that the transaction information may be used as a search query (e.g., by a user) to search the ledger 150 for the aggregated component data and/or the root 240.

Figure 10:
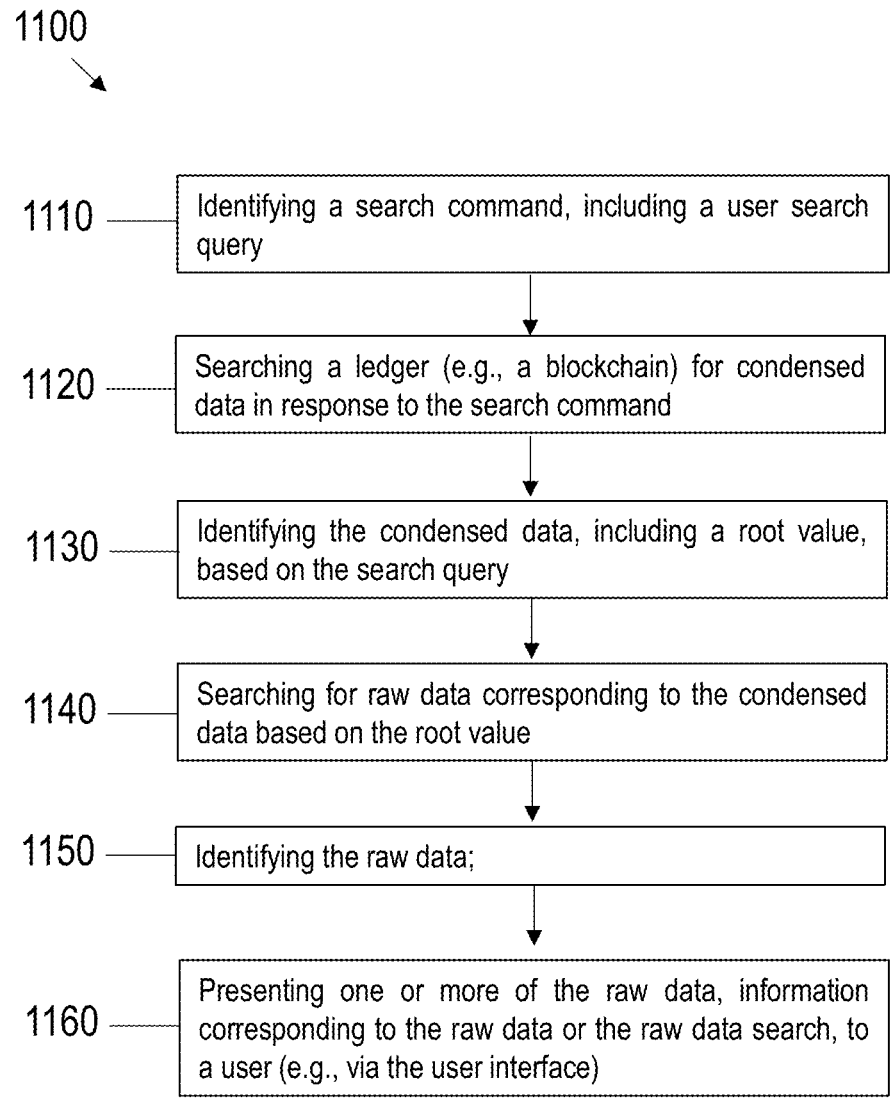
FIG. 10 is a flowchart of an exemplary embodiment of a method of retrieving data from a secure ledger, in accordance with the general inventive concepts.

With continued reference to the figures, and with reference now to FIG. 10, a method 1100 for retrieving aggregated raw data from a ledger 150 (e.g., a public blockchain) and identifying the corresponding raw data is provided.

In step 1110, the method includes identifying a search command, including a user search query. The search command may be initiated from a user device 400 (e.g., via a user interface). In step 1120, the method includes searching a ledger 150 (e.g., a blockchain) for condensed data in response to the search command.

In some embodiments, the ledger 150 may be searched via a data retrieval mechanism, which provides a concise way for denoting the year, month, day in a tag for data retrieval. The idea is to use Roman numerals to convert the year and day into letters, and use the short-hand notation for the month, in a concise form. In between the year and month, month and day, a special symbol that is permitted by the blockchain will be used as the separator. For example, IOTA ledger allows only letters and number 9 in its tag field, which we would use number 9 as separator.

The following is an example mapping: Using this mechanism, for example, 2021 Mar. 4 would be denoted as MMXXI9MAR9IV.

| Year mapping: | Month mapping: | Day mapping: |
|---|---|---|
| 2020: "MMXX", | 1: "JAN", | 1: "I", |
| 2021: "MMXXI", | 2: "FEB", | 2: "II", |
| 2022: "MMXXII", | 3: "MAR", | 3: "III", |
| 2023: "MMXXIII", | 4: "APR", | 4: "IV", |
| 2024: "MMXXIV", | 5: "MAY", | 5: "V", |
| 2025: "MMXXV", | 6: "JUN", | 6: "VI", |
| 2026: "MMXXVI", | 7: "JUL", | 7: "VII", |
| 2027: "MMXXVII", | 8: "AUG", | 8: "VIII", |
| 2028: "MMXXVIII", | 9: "SEP", | 9: "IX", |
| 2029: "MMXXIX", | 10: "OCT", | 10: "X", |
| 2030: "MMXXX", | 11: "NOV", | 11: "XI", |
| 2031: "MMXXXI" | 12: "DEC" | 12: "XII" |

In step 1130, the condensed data, including root value, is identified based on the search query.

In step 1140, the method includes searching for raw data corresponding to the condensed data based on the root 240. In some embodiments, a search for the raw data may begin immediately upon identifying the corresponding root 240 with the aggregated data. Additionally, or alternatively, a search for the raw data may be initiated by user command (e.g., via the user interface).

In step 1150, the method includes identifying the raw data corresponding to the condensed data, and in step 1160, the method includes presenting one or more of the raw data, information corresponding to the raw data and/or the raw data search to a user (e.g., via the user interface).

It will be appreciated that aspects of an example logging and retrieval system 100—which may be used with a ledger 150 (e.g., a secured distributed ledger (e.g., blockchain))—and methods disclosed herein (e.g., method 1000, 1100, and/or 1200) may be implemented by any appropriate processor system using any appropriate programming language or programming technique. The system can take the form of any appropriate circuitry, such as may involve a hardware embodiment, a software embodiment or an embodiment comprising both hardware and software elements.

In one embodiment, the system 100 may be implemented by way of software and hardware (e.g., processor, sensors, etc.), which may include but is not limited to firmware, resident software, microcode, etc. Furthermore, parts of the processor system can take the form of a computer program product accessible from a processor-usable or processor-readable medium providing program code for use by or in connection with a processor or any instruction execution system. Examples of processor-readable media may include non-transitory tangible processor-readable media, such as a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Various networks may be implemented in accordance with the embodiments described herein, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism.

Computers may be connected over the Internet, an Intranet, Extranet, Ethernet, or any other system that provides communications. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

The term "module" used herein will be appreciated as comprising various configurations of computer hardware and/or software implemented to perform operations. In some embodiments, logics or modules as described may be represented as instructions operable to be executed by a processor and a memory. In other embodiments, logics or modules as described may be represented as instructions read or executed from a computer readable media. A logic or module may be generated according to application specific parameters and/or user settings. It will be appreciated by those of skill in the art that such configurations of hardware and software may vary, but remain operable in substantially similar ways.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, any products, methods and/or systems described herein are not limited to the specific details, the representative embodiments, and/or the illustrative examples shown and described. Accordingly, departures may be made from such details without departing from the spirit or scope of the general aspects of the present disclosure.

What is claimed is:

1. A system for logging data comprising:
    a memory storing programmable instructions for logging data to a ledger thereon;
    a processor in communication with the memory and configured to execute the programmable instructions to perform steps including:
       receiving component data from one or more sensors;
       calculating a root value based in part on component data received from one or more sensors;
       aggregating the component data;
       linking the aggregated component data to the root value; and
       logging the aggregated component data to the ledger.

2. The system of claim 1 further comprising:
    authenticating the one or more sensors prior to receiving the component data.

3. The system of claim 1 further comprising:
    one or more components in communication with one or more sensors, wherein the one or more sensors collect the component data of the one or more components.

4. The system of claim 3, wherein the component data includes at least one of a condition of the one or more components or operational data of the one or more components.

5. The system of claim 1 further comprising:
    storing the component data for subsequent reference or retrieval prior to aggregating the component data.

6. The system of claim 5, wherein the ledger is a blockchain, and wherein a transaction ID associated with the logging of the aggregated data is identified for subsequent retrieval of one or more of the aggregated data or stored component data.

7. The system of claim 5, wherein the component data is stored to a local server or a cloud based server, and wherein one or more of the local server and the cloud-based server includes a redundant array of independent disks for component data redundancy.

8. The system of claim 5, wherein a Merkle tree is used to calculate the root value, and wherein the Merkle tree root value for the component data is the root value.

9. The system of claim 8, wherein the root value is included with the stored component data and the aggregated data in the ledger.

10. A method of logging data to a ledger, comprising:
    receiving component data from one or more sensors;
    calculating a root value for the component data;
    aggregating the component data;
    linking the aggregated component data to the component data via the root value;
    logging the aggregated component data including the root value to the ledger.

11. The method of claim 10 further comprising:
    authenticating the one or more sensors prior to receiving the component data.

12. The method of claim 11, wherein one or more of the sensors are authenticated using a sensor ID.

13. The method of claim 10 further comprising:
    identifying a transaction ID associated with the logging of one or more of the aggregated data or the root value to the ledger.

14. The method of claim 10, further comprising:
    storing the component data and the root data prior to the linking step.

15. A method of retrieving data comprising:
    searching a ledger based on a search query;
    identifying condensed data including a root data in the ledger based on the search query;
    searching a storage device for raw data based on the root data;
    identifying the raw data; and
    presenting the raw data or information corresponding to the searched raw data to a user.

16. The method of claim 15 further comprising:
    receiving a search command from a user prior to the first search, wherein the search command includes the search query.

17. The method of claim 16, wherein the search command is submitted by the user via a user interface, and wherein the raw data or information corresponding to the raw data search is presented via the user interface.

18. The method of claim 15, wherein the search query includes transaction information corresponding to a logging of at least one or more of the condensed data or root data to the ledger.

19. The method of claim 18, wherein the search query includes additional criteria corresponding to at least one or more of the raw data, the condensed data, or the transaction information associated with the logging of the condensed data or root data to the ledger.

* * * * *